United States Patent
Cho

(10) Patent No.: US 7,730,234 B2
(45) Date of Patent: Jun. 1, 2010

(54) COMMAND DECODING SYSTEM AND METHOD OF DECODING A COMMAND INCLUDING A DEVICE CONTROLLER CONFIGURED TO SEQUENTIALLY FETCH THE MICRO-COMMANDS IN AN INSTRUCTION BLOCK

(75) Inventor: Myoung-Jae Cho, Secho-gu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/774,131

(22) Filed: Jul. 6, 2007

(65) Prior Publication Data

US 2008/0059709 A1    Mar. 6, 2008

(30) Foreign Application Priority Data

Jul. 7, 2006    (KR) .................... 10-2006-0063740

(51) Int. Cl.
*G06F 13/00*    (2006.01)
*G06F 12/00*    (2006.01)

(52) U.S. Cl. .................... 710/33; 5/32; 5/34; 711/103; 711/125; 711/137

(58) Field of Classification Search .................... 710/5, 710/32–34, 22–24, 26, 129; 711/103, 137, 711/125

See application file for complete search history.

(56) References Cited

U.S. PATENT DOCUMENTS

| | | | | |
|---|---|---|---|---|
| 5,005,121 A | * | 4/1991 | Nakada et al. | 710/26 |
| 6,128,703 A | * | 10/2000 | Bourekas et al. | 711/138 |
| 6,154,829 A | * | 11/2000 | Mino et al. | 712/35 |
| 6,175,937 B1 | * | 1/2001 | Norman et al. | 714/718 |
| 6,778,436 B2 | | 8/2004 | Piau et al. | |
| 7,340,566 B2 | * | 3/2008 | Voth et al. | 711/137 |
| 7,463,501 B2 | * | 12/2008 | Dosaka et al. | 365/49.1 |
| 7,555,635 B2 | * | 6/2009 | Ohtani et al. | 712/221 |
| 2005/0289253 A1 | * | 12/2005 | Edirisooriya et al. | 710/22 |
| 2007/0260810 A1 | * | 11/2007 | Chuang | 711/103 |

FOREIGN PATENT DOCUMENTS

| | | |
|---|---|---|
| KR | 1020040021043 A | 3/2004 |
| KR | 1020050035836 A | 4/2005 |

\* cited by examiner

*Primary Examiner*—Tammara Peyton
(74) *Attorney, Agent, or Firm*—Volentine & Whitt, PLLC

(57) ABSTRACT

A command decoding system includes a main processor, an instruction memory, a memory controller, and a device controller. The main processor provides a command, and the instruction memory stores an instruction block corresponding to the command. The instruction block includes micro-commands for executing the command. The memory controller controls an access to the instruction memory, and the device controller receives the command, and sequentially fetches the micro-commands included in the instruction block corresponding to the command through the memory controller to execute the fetched micro-commands.

12 Claims, 7 Drawing Sheets

FIG.3

| INST_REG | BIT | DESCRIPTION |
|---|---|---|
| INSTCODE | [15:12] | 0000:NOP<br>0001:WRITE COMMAND<br>0010:WRITE ADDRESS<br>0011:WAIT RnB<br>0100:DATA TRANSFER DMA REQUEST (OFFSET IS NUMBER OF DATA TO TRANSFER)<br>0110:CHECK ECC<br>0111:WRITE DATA<br>1000:INIT ECC<br>1111:STOP OPERATION |
| OFFSET | [11:0] | ADDITIONAL INFORMATION RELEVANT TO INSTRUCTION |

FIG.4

| FUCTION | 1st CYCLE | 2nd CYCLE | ACCEPTABLE COMMAND DURING BUSY |
|---|---|---|---|
| READ | 00h | 30h | |
| READ FOR COPY BACK | 00h | 35h | |
| READ ID | 90h | – | 0 |
| RESET | FFh | – | |
| PAGE PROGRAM | 80h | 10h | |
| TWO-PLANE PAGE PROGRAM | 80h~11h | 81h~10h | |
| COPY BACK PROGRAM | 85h | 10h | |
| TWO-PLANE COPY-BLOCK PROGRAM | 85h~11h | 81h~10h | |
| BLOCK ERASE | 60h | D0h | |
| TWO-PLANE BLOCK ERASE | 60h~60h | D0h | |
| RANDOM DATA INPUT | 85h | – | |
| RANDOM DATA OUTPUT | 05h | E0h | |
| READ STATUS | 70h | | 0 |
| READ EDC STATUS | 7Bh | | 0 |

COMMAND DECODING SYSTEM AND METHOD OF DECODING A COMMAND INCLUDING A DEVICE CONTROLLER CONFIGURED TO SEQUENTIALLY FETCH THE MICRO-COMMANDS IN AN INSTRUCTION BLOCK

CROSS-REFERENCE TO RELATED APPLICATIONS

A claim of priority under 35 USC § 119 is made to Korean Patent Application No. 2006-63740, filed Jul. 7, 2006, in the Korean Intellectual Property Office (KIPO), the disclosure of which is incorporated herein in its entirety by reference.

BACKGROUND OF THE INVENTION

1. Field of the Invention

The present invention generally relates to the decoding of commands, and more particularly to a command decoding system, a flash memory command decoding system, a method of decoding a command, and a method of decoding a flash memory command.

2. Description of the Related Art

In addition to a main processor, electronic devices such as computer systems and cellular phones also include various peripheral devices such as a display device, a keyboard, and a memory. The main processor transmits commands to the peripheral devices to control the peripheral devices.

Generally, each of the peripheral devices includes a device controller for executing a transmitted command from the main processor, and executes at least one micro-command corresponding to the transmitted command so as to process the transmitted command from the main processor.

For example, in the case of a flash memory controller of a flash memory, when the main processor provides a read command for reading data stored in a specific address to the flash memory controller, the flash memory controller sequentially executes micro-commands corresponding to the read command so as to execute the read command, and provides the data stored in the specific address to the main processor.

An operation in which the device controller executes the micro-commands may be in accordance with two different methods.

A first method is where the device controller directly receives the micro-commands from the main processor. Here, the device controller includes a register directly accessible by the main processor, and executes the micro-commands received from the main processor. In this first method, an operational speed is disadvantageously decreased since the main processor has to directly transmit data to the device controller.

A second method is where the device controller includes a micro-command table used for storing the micro-commands and executes the micro-commands corresponding to the command by using the micro-command table. Here, the device controller decodes a command received from the main processor, searches the micro-commands corresponding to the decoded command for the micro-command table and executes the searched micro-commands. In the second method, the micro-command table is generated when the device controller is manufactured, and the generated micro-command table is not changed after the device controller is manufactured. Therefore, the device controller is unable to add new micro-commands and executes only pre-defined micro-commands.

SUMMARY OF THE INVENTION

In some embodiments of the present invention, a command decoding system includes a main processor configured to provide a command, an instruction memory configured to store an instruction block corresponding to the command, the instruction block including micro-commands for executing the command, a memory controller configured to control an access to the instruction memory, and a device controller configured to receive the command, and configured to sequentially fetch the micro-commands included in the instruction block corresponding to the command through the memory controller to execute the fetched micro-commands.

The device controller may decode the received command, transmit a read command for the micro-commands included in the instruction block corresponding to the command to the memory controller, and receives the micro-commands from the memory controller to execute the received micro-commands.

The device controller may include a command register configured to store the received command, a command decoder configured to decode the stored command, configured to transmit a read command for the micro-commands included in the instruction block corresponding to the decoded command to the memory controller, and configured to receive the micro-commands from the memory controller, and a command executor configured to execute the received micro-commands.

In other embodiments of the present invention, a flash memory command decoding system includes a main processor configured to provide a flash memory command, an instruction memory configured to store an instruction block corresponding to the flash memory command, the instruction block including micro-commands for executing the flash memory command, a memory controller configured to control an access to the instruction memory, and a flash memory controller configured to receive the flash memory command, and configured to sequentially fetch the micro-commands included in the instruction block corresponding to the flash memory command through the memory controller to execute the fetched micro-commands.

The flash memory controller may decode the received flash memory command, may transmit a read command for the micro-commands included in the instruction block corresponding to the flash memory command to the memory controller, and may receive the micro-commands from the memory controller to execute the received micro-commands.

The flash memory controller may include a command register configured to store the received flash memory command, a command decoder configured to decode the stored flash memory command, configured to transmit a read command for the micro-commands included in the instruction block corresponding to the decoded flash memory command to the memory controller, and configured to receive the micro-commands from the memory controller, and a command executor configured to execute the received micro-commands.

The flash memory controller may further include a cache memory, and the command decoder may search, in advance, the cache memory for the micro-commands included in the instruction block corresponding to the decoded flash memory command.

Also, the flash memory controller may further include an error correction unit configured to perform an error correction when the flash memory controller transmits or receives data.

Each of the micro-commands may include a first part representing a flash memory controller command for the flash memory controller and a second part representing additional information corresponding to the flash memory controller command. For example, the first part may be configured with four bits and the second part may be configured with twelve bits.

In still other example embodiments of the present invention, a method of decoding a command includes receiving a command from a main processor, sequentially fetching micro-commands included in an instruction block corresponding to the received command through a memory controller, the instruction block including the micro-commands for executing the received command, and executing the fetched micro-commands.

Sequentially fetching the micro-commands may include decoding the received command, and transmitting a read command for the micro-commands included in the instruction block corresponding to the decoded command to the memory controller.

In still other example embodiments of the present invention, a method of decoding a flash memory command includes receiving a flash memory command from a main processor, sequentially fetching micro-commands included in an instruction block corresponding to the received flash memory command through a flash memory controller, the instruction block including the micro-commands for executing the received flash memory command, and executing the fetched micro-commands.

Sequentially fetching the micro-commands may include decoding the received flash memory command, and transmitting a read command for the micro-commands included in the instruction block corresponding to the decoded flash memory command to the memory controller.

The method may further include performing an error correction operation when the flash memory controller transmits or receives data.

Sequentially fetching the micro-commands may include searching, in advance, a cache memory for the micro-commands included in the instruction block corresponding to the decoded flash memory command

BRIEF DESCRIPTION OF THE DRAWINGS

The above and other aspect and features of embodiments of the present invention will become readily apparent from the description that follows, with reference to the accompanying drawings, in which:

FIG. 3 is a table illustrating examples of micro-commands of a flash memory controller.

FIG. 4 is a table representing examples of detailed commands that are used in a flash memory controller.

DESCRIPTION OF THE EMBODIMENTS

Figure 1:
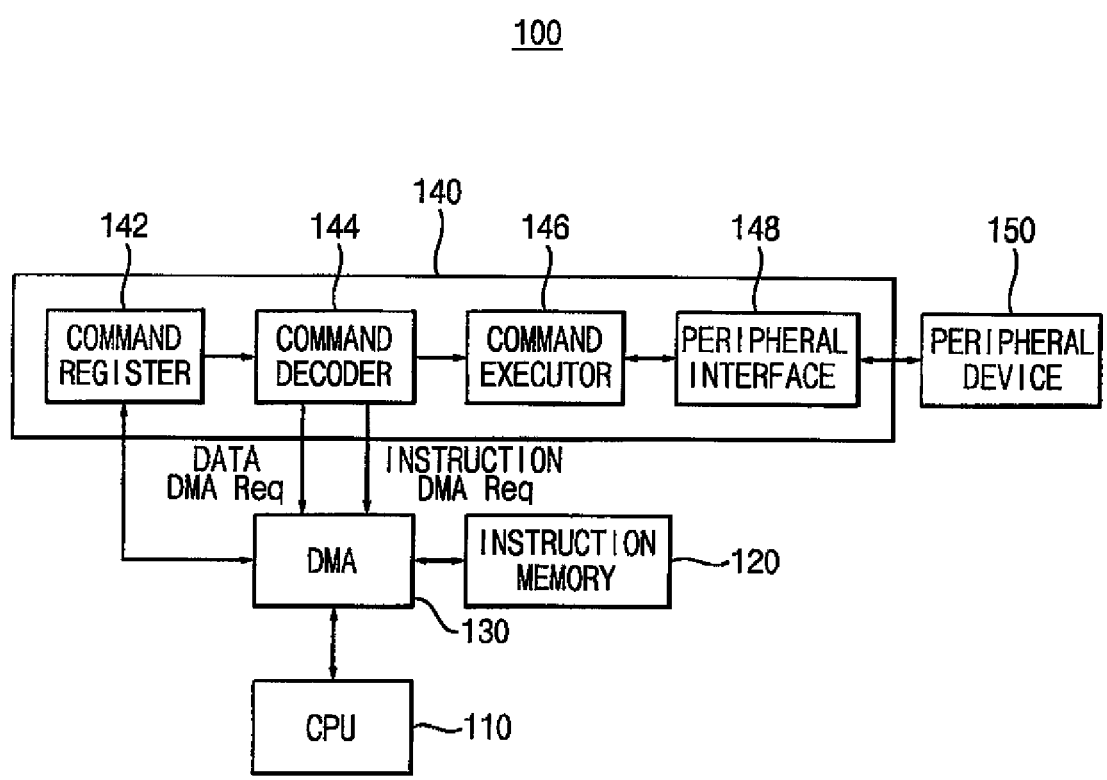
FIG. 1 is a block diagram illustrating a flash memory command decoding system according to an example embodiment of the present invention.

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention now will be described more fully hereinafter with reference to the accompanying figures, in which embodiments of the invention are shown. However, it should be understood that there is no intent to limit the invention to the particular forms disclosed, but on the contrary, the invention is to cover all modifications, equivalents, and alternatives falling within the spirit and scope of the invention as defined by the claims.

FIG. 1 is a block diagram illustrating a flash memory command decoding system according to an example embodiment of the present invention.

Referring to FIG. 1, the command decoding system 100 of this example includes a main processor 110, an instruction memory 120, a memory controller 130 and a device controller 140. Also, as shown in the figure, the command decoding system 100 may further include a peripheral device 150.

The main processor 110 provides a command to the device controller 140. For example, assuming that the device controller 140 corresponds to a flash memory controller, the main processor 110 transmits a read command for reading data stored in a specific address to the flash memory controller.

The instruction memory 120 stores instruction blocks corresponding to all commands provided by the main processor 110. Each of the instruction blocks includes micro-commands for executing the command.

The memory controller 130 provides an interface when the device controller 140 accesses the instruction memory 120 or when the main processor 110 accesses the device controller 140. That is, the memory controller 130 may control access to the instruction memory 120. For example, the memory controller 130 may correspond to a direct memory access (DMA) in a computer system.

The device controller 140 of this example includes a command register 142, a command decoder 144, a command executor 146 and a peripheral interface 148.

The device controller 140 receives a command outputted from the main processor 110, and fetches micro-commands included in the instruction block corresponding to the command to execute the fetched micro-commands.

That is, the device controller 140 decodes the command received from the main processor 110, transmits a read command for the micro-commands included in the instruction block, and receives the micro-commands from the memory controller 130 to execute the received micro-commands.

For example, assuming that the device controller 140 corresponds to a flash memory controller, the flash memory controller receives a flash memory command from the main processor 110 and sequentially fetches micro-commands included in an instruction block corresponding to the flash memory command through the memory controller 130 to execute the fetched micro-commands.

That is, the flash memory controller decodes the flash memory command received from the main processor 110, transmits a read command for micro-commands included in an instruction block corresponding to the decoded flash memory command to the memory controller 130, and receives the micro-commands from the memory controller 130 to execute the received micro-commands.

The command register 142 stores a command received from the main processor 110. For example, assuming that the device controller 140 corresponds to a flash memory controller, the command register 142 may store a flash memory command.

The command decoder 144 decodes the command stored in the command register 142, transmits a read command for the micro-commands included in the instruction block to the memory controller 130, and receives the micro-commands from the memory controller 130. For example, assuming that the device controller 140 corresponds to a flash memory controller, the command decoder 144 decodes the flash memory command, transmits a read command for micro-commands included in an instruction block corresponding to the decoded flash memory command to the memory controller 130, and receives the micro-commands from the memory controller 130.

The command executor 146 executes the received micro-commands. For example, assuming that the device controller 140 corresponds to a flash memory controller, the command executor 146 may execute the received micro-commands.

The peripheral interface 148 is used when the device controller 140 accesses to the peripheral device 150. For example, assuming that the device controller 140 corresponds to a flash memory controller, the peripheral device 150 may correspond to a flash memory. Assuming that the command received from the main processor 110 corresponds to a command for reading data stored in a specified address of the flash memory, the flash memory controller accesses the flash memory through the peripheral interface 148.

Figure 2:
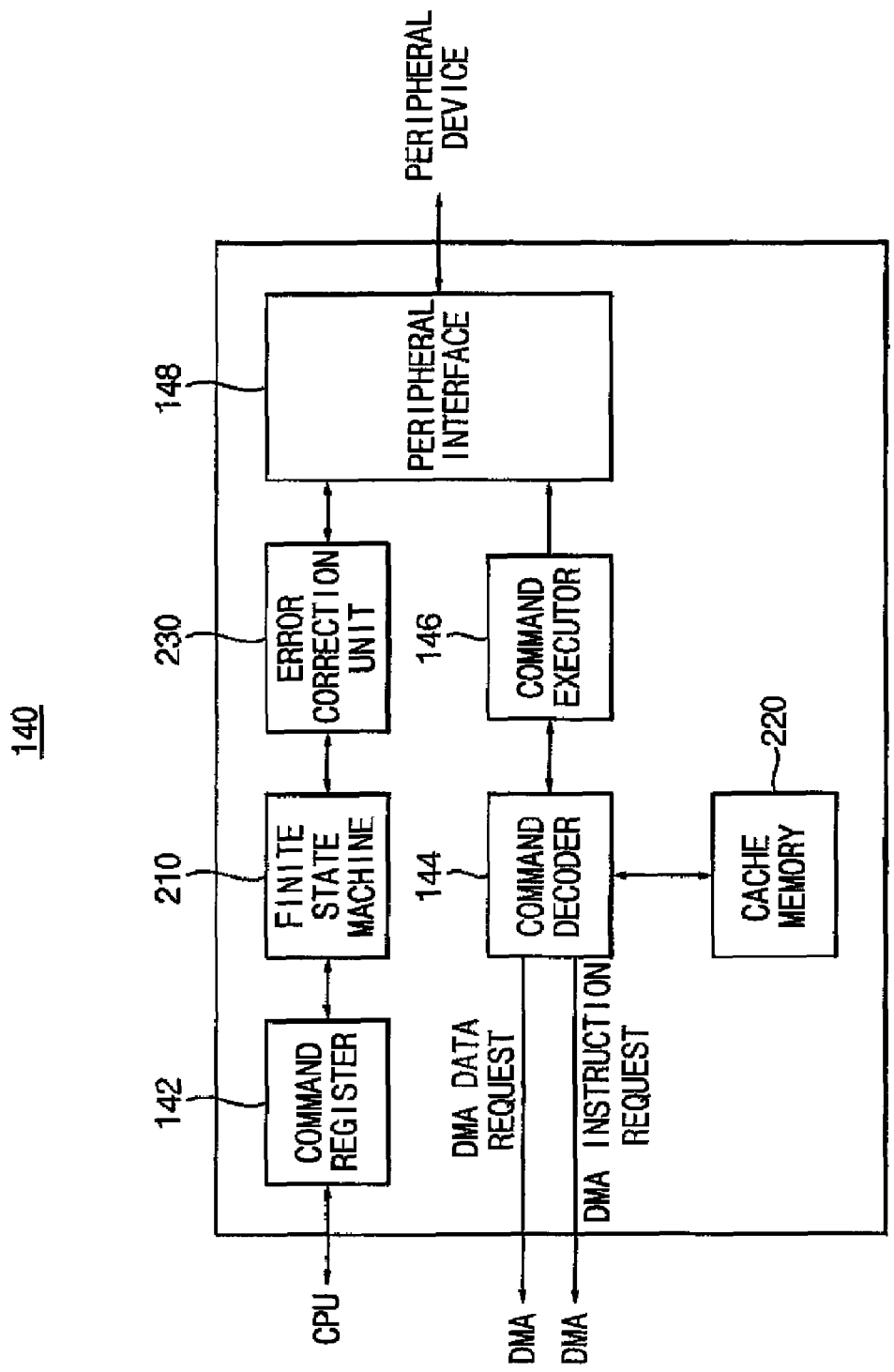
FIG. 2 is a block diagram illustrating a more detailed example of the device controller shown in FIG. 1.

FIG. 2 is a block diagram illustrating a more detailed example of the device controller 140 shown in FIG. 1.

Referring to FIG. 2, the device controller 140 includes a command register 142, a command decoder 144, a command executor 146 and a peripheral interface 148. Also, the device controller 140 may further include a finite state machine (FSM) 210, a cache memory 220 and an error correction unit 230.

The command register 142 stores a command received from the main processor 110. For example, assuming that the device controller 140 corresponds to a flash memory controller, the command register 142 may store a flash memory command.

The FSM 210 manages status information of the device controller 140, and may control an entire operation of the device controller 140. For example, assuming that the device controller 140 corresponds to a flash memory controller, the FSM 210 controls the flash memory controller so that the command decoder 210 and the error correction unit 230 may be simultaneously operated.

The cache memory 220 is a memory for storing the instruction block corresponding to a command previously executed. Generally, since an access speed from the device controller 140 to the cache memory 220 is faster than that from the device controller 140 to the instruction memory 120, the cache memory 220 may improve a performance of the device controller 140.

The command decoder 144 decodes the command stored in the command register 142, transmits a read command for the micro-commands included in the instruction block to the memory controller 130, and receives the micro-commands from the memory controller 130.

For example, assuming that the device controller 140 corresponds to a flash memory controller, the command decoder 144 decodes the flash memory command, transmits a read command for micro-commands included in an instruction block corresponding to the decoded flash memory command to the memory controller 130, and receives the micro-commands from the memory controller 130.

Also, the command decoder 144 searches, in advance, the cache memory 220 for the micro-commands included in the instruction block corresponding to the decoded flash memory command.

The command executor 146 executes the received micro-commands. For example, assuming that the device controller 140 corresponds to a flash memory controller, the command executor 146 may execute the received micro-commands.

The error correction unit 230 performs an error correction when the flash memory controller transmits or receives data. For example, assuming that the device controller 140 corresponds to a flash memory controller, the error correction unit 230 performs an error correction when the device controller 140 reads data from the cache memory or when the device controller 140 writes data into the cache memory.

The peripheral interface 148 is used when the device controller 140 accesses to the peripheral device 150. For example, assuming that the device controller 140 corresponds to a flash memory controller, the peripheral device 150 may correspond to a flash memory. Assuming that the command received from the main processor 110 corresponds to a command for reading data stored in a specified address of the flash memory, the flash memory controller accesses the flash memory through the peripheral interface 148.

Hereinafter, an operation of the flash memory controller is described with reference to FIGS. 3 through 7. In these operational examples, it is assumed that the device controller 140 corresponds to a flash memory controller.

FIG. 3 is a table illustrating examples of micro-commands of a flash memory controller.

Referring to FIG. 3, each of the micro-commands includes a first part INSTCODE representing a flash memory controller command for the flash memory controller and a second part OFFSET representing additional information corresponding to the flash memory controller command. For example, the first part INSTCODE may be configured with 4 bits and the second part OFFSET may be configured with 12 bits.

The first part INSTCODE represents a micro-command and the micro-command may have 16 codes from code '0000' to code '1111'.

For example, the micro-commands may include no operation code NOP '0000', a specific command code '0001' (WRITE COMMAND), a specific address code '0010' (WRITE ADDRESS), a wait command in a 'ready and busy' status '0011' (WAIT RnB), a data transfer code for requesting a data transfer to a memory controller '0100' (DATA TRANSFER DMA REQUEST), an error correction code check code '0110' (CHECK ECC), a write data code '0111' (WRITE DATA), an error correction code initialization code '1000' (INIT ECC), and a stop operation code '1111' (STOP OPERATION).

The second part OFFSET represents additional information corresponding to the flash memory controller command. For example, when the first part INSTCODE corresponds to '0001' (WRITE COMMAND), the second part OFFSET includes an instruction code such as a read command and a write command.

Figure 5:
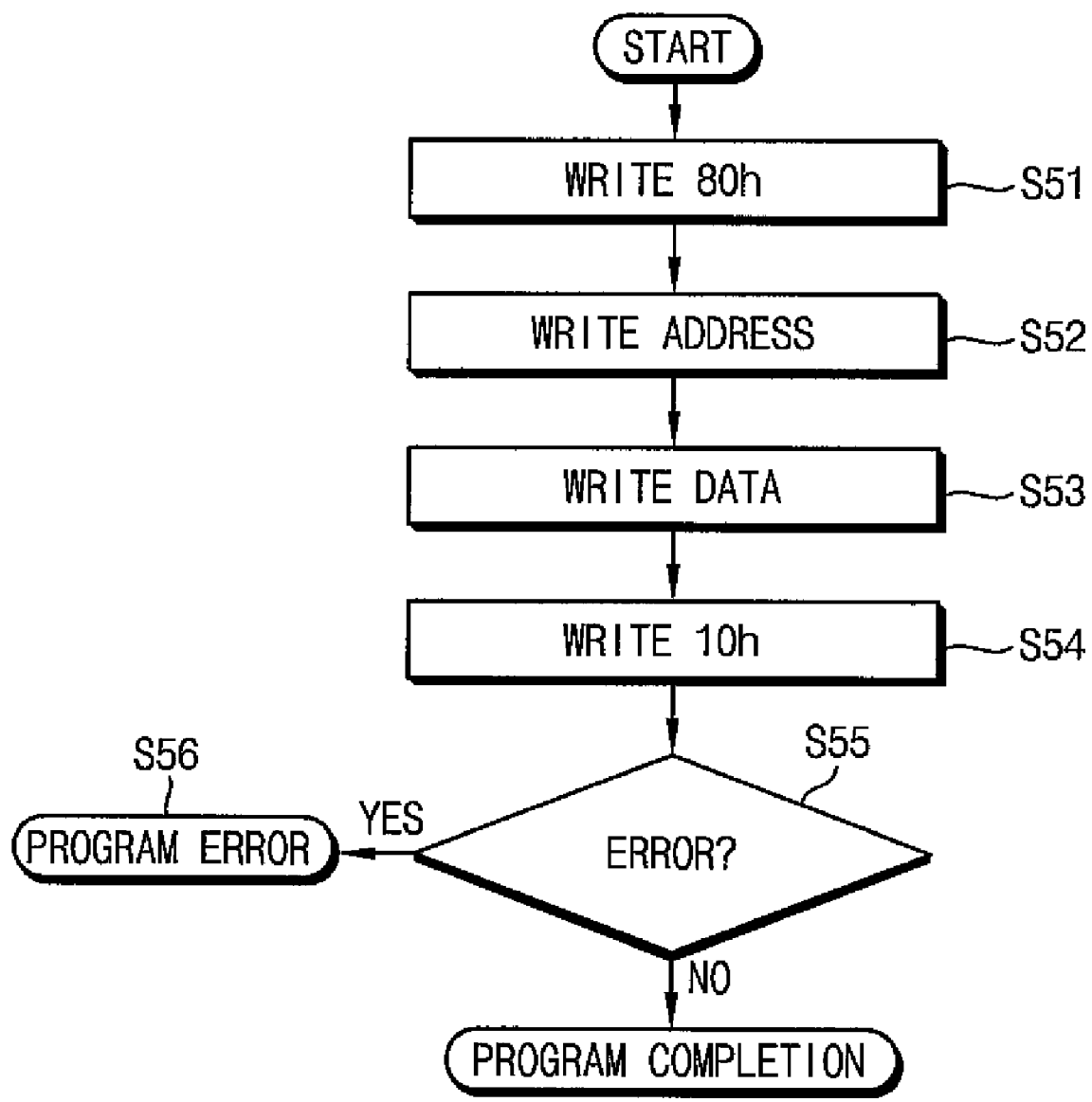
FIG. 5 is a flowchart illustrating an example of a procedure in which a flash memory controller performs a program operation.
Figure 6:
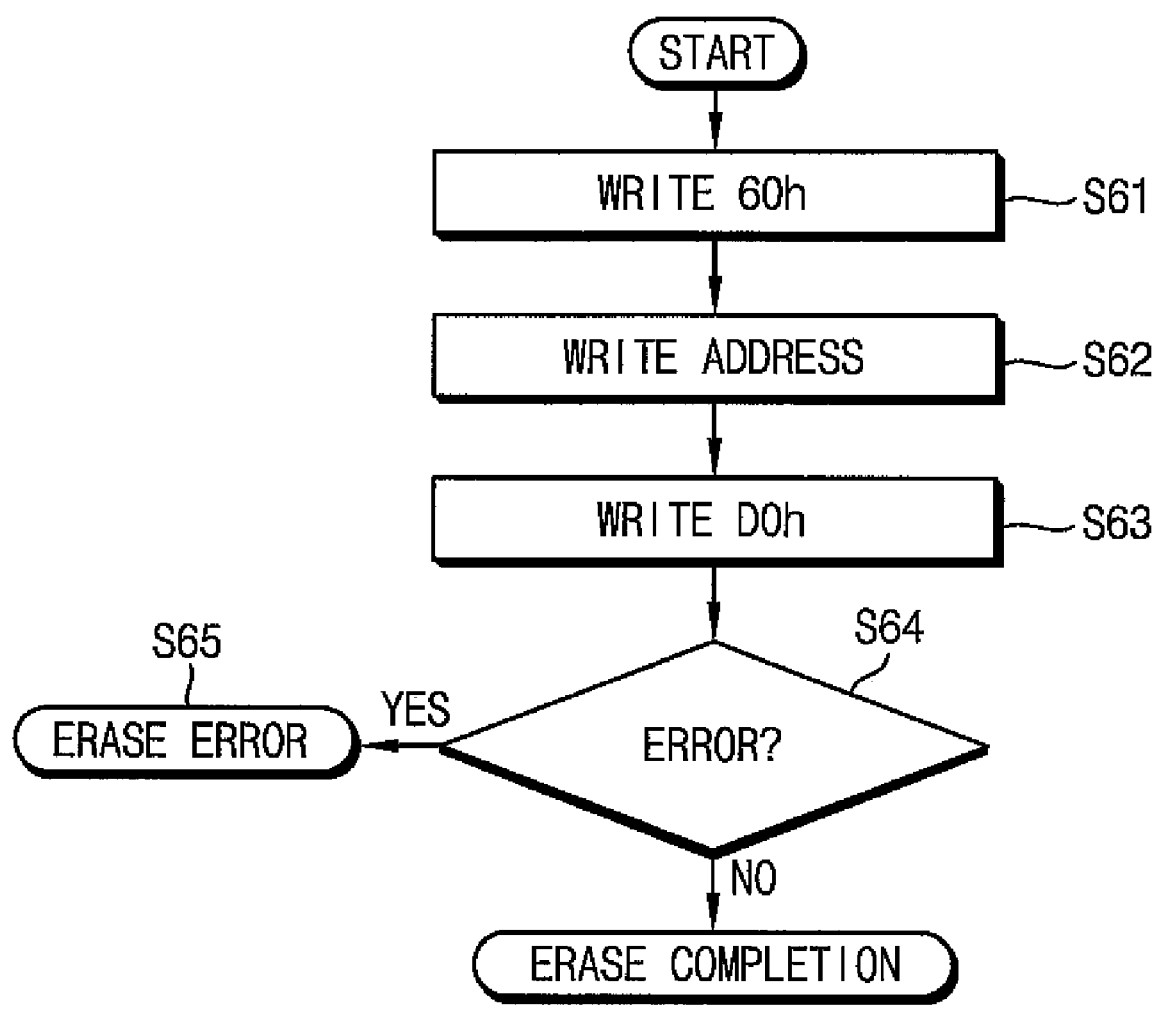
FIG. 6 is a flowchart illustrating an example of a procedure in which a flash memory controller performs an erase operation.
Figure 7:
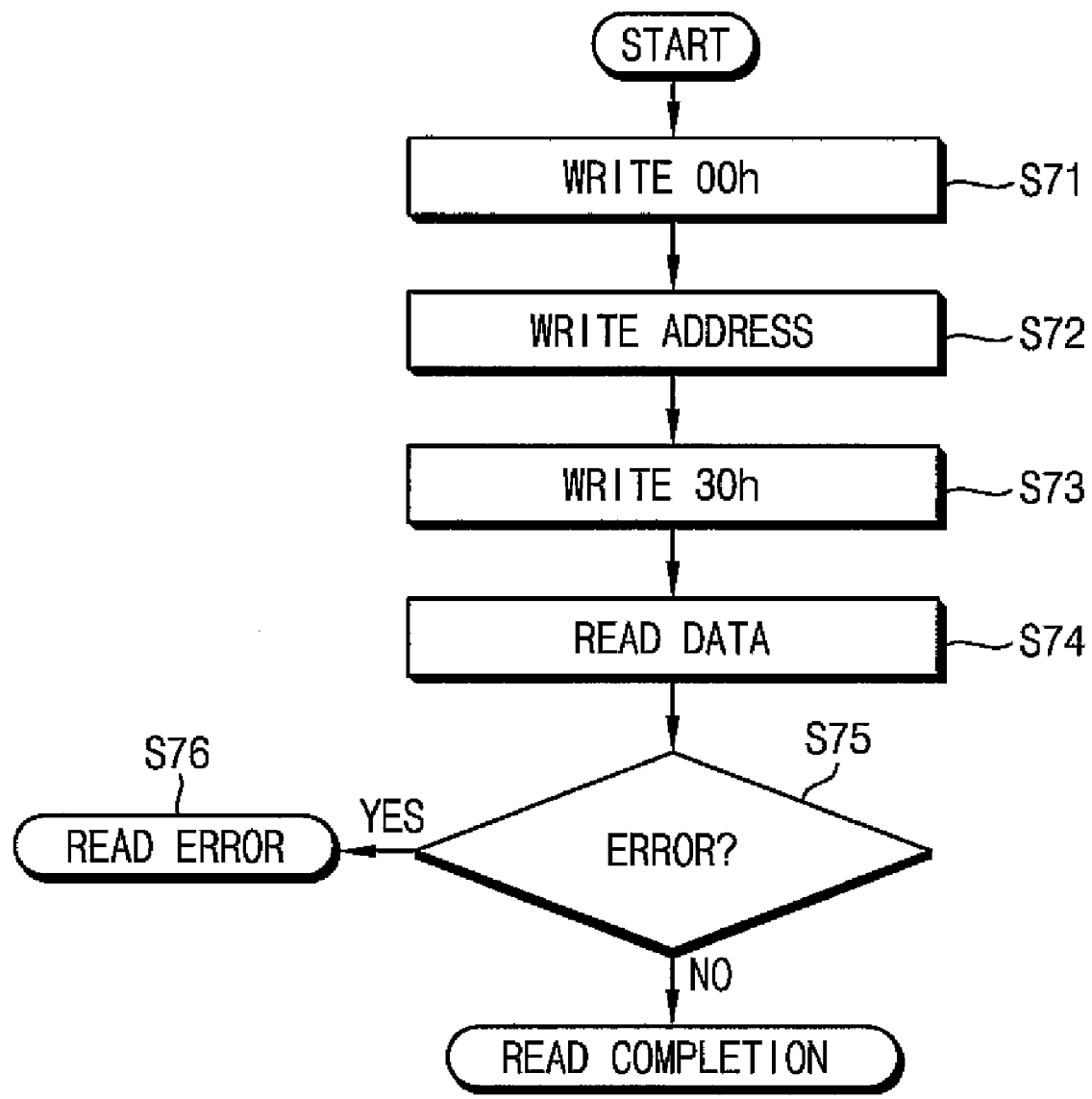
FIG. 7 is a flowchart illustrating an example of a procedure in which a flash memory controller performs a read operation.

FIG. 4 is a table representing examples of detailed commands that are used in a flash memory controller, and FIGS. 5 through 7 are flowcharts illustrating procedures where a flash memory controller executes micro-commands.

FIG. 5 is a flowchart illustrating an example of a procedure in which a flash memory controller performs a program operation.

The flash memory controller receives a program command from the main processor 110, and reads an instruction block corresponding to the program command through the memory controller 130.

The flash memory controller reads a micro-command representing an 80h command (Step S51). Referring to FIG. 4, since a first stage in a page program command corresponds to 80h, the flash memory controller instructs a start of the page program command.

The flash memory controller transmits an address value to a flash memory (Step S52), and transmits a data value to the flash memory (Step S53).

After the flash memory controller transmits data including the address value and the data value, the flash memory controller reads a micro-command for executing an 10h command through the memory controller 130 (Step S54). Referring to FIG. 4, because a second stage in a page program command corresponds to 10h, the flash memory controller instructs an end of the page program command.

After the flash memory controller executes the page program command, the flash memory controller checks (or verifies) whether an error occurs (Step S55). If an error occurs, the flash memory controller indicates that a program error has occurred (Step S56), and completes the page program command.

FIG. 6 is a flowchart illustrating an example of a procedure in which a flash memory controller performs an erase operation.

The flash memory controller receives an erase command from the main processor 110, and reads an instruction block corresponding to the erase command through the memory controller 130

The flash memory controller reads a micro-command representing a 60h command (Step S61). Referring to FIG. 4, since a first stage in a block erase command corresponds to 60h, the flash memory controller instructs a start of the block erase command.

The flash memory controller transmits an address value to a flash memory (Step S62), and erases a corresponding block of the flash memory.

After the flash memory controller transmits data including the address value, the flash memory controller reads a micro-command for executing a D0h command through the memory controller 130 (Step S63). Referring to FIG. 4, since a second stage in a block erase command corresponds to D0h, the flash memory controller instructs an end of the block erase command.

After the flash memory controller executes the block erase command, the flash memory controller checks whether an error occurs (Step S54). If an error occurs, the flash memory controller indicates that a program error has occurred (Step S55), and completes the block erase command.

FIG. 7 is a flowchart illustrating an example of a procedure in which a flash memory controller performs a read operation.

The flash memory controller receives a read command from the main processor 110, and reads an instruction block corresponding to the read command through the memory controller 130.

The flash memory controller reads a micro-command representing a 00h command (Step S71). Referring to FIG. 4, since a first stage in a read command corresponds to 00h, the flash memory controller instructs a start of the read command.

The flash memory controller transmits an address value to a flash memory (Step S72).

After the flash memory controller transmits data including the address value, the flash memory controller reads a micro-command for executing a 30h command through the memory controller 130 (Step S73). Referring to FIG. 4, since a second stage in a read command corresponds to 30h, the flash memory controller instructs an end of the read command.

The flash memory controller reads a corresponding block of the flash memory (Step S74). After the flash memory controller executes the read command, the flash memory controller checks whether an error occurs (Step S75). If an error occurs, the flash memory controller indicates that a program error has occurred (Step S76), and completes the read command.

As described above, a command decoding system according to example embodiments of the present invention uses an instruction memory and a memory controller to facilitate the addition of a new command and to increase an operation speed.

While the example embodiments of the present invention and their advantages have been described in detail, it should be understood that various changes, substitutions and alterations may be made herein without departing from the scope of the invention.

What is claimed is:

1. A command decoding system, comprising:
    a main processor configured to provide a command;
    an instruction memory configured to store an instruction block corresponding to the command, the instruction block including micro-commands for executing the command;

a memory controller configured to control an access to the instruction memory; and a device controller configured to receive the command, and configured to sequentially fetch the micro-commands included in the instruction block corresponding to the command through the memory controller to execute the fetched micro-commands, wherein the device controller decodes the received command, transmits a read command for the micro-commands included in the instruction block corresponding to the command to the memory controller, and receives the micro-commands from the memory controller to execute the received micro-commands.

2. The command decoding system of claim 1, wherein the device controller comprises:

a command register configured to store the received command;

a command decoder configured to decode the stored command, configured to transmit a read command for the micro-commands included in the instruction block corresponding to the decoded command to the memory controller, and configured to receive the micro-commands from the memory controller; and a command executor configured to execute the received micro-commands.

3. A flash memory command decoding system, comprising:

a main processor configured to provide a flash memory command;

an instruction memory configured to store an instruction block corresponding to the flash memory command, the instruction block including micro-commands for executing the flash memory command;

a memory controller configured to control an access to the instruction memory; and a flash memory controller configured to receive the flash memory command, and configured to sequentially fetch the micro-commands included in the instruction block corresponding to the flash memory command through the memory controller to execute the fetched micro-commands, wherein the flash memory controller decodes the received flash memory command, transmits a read command for the micro-commands included in the instruction block corresponding to the flash memory command to the memory controller, and receives the micro-commands from the memory controller to execute the received micro-commands.

4. The flash memory command decoding system of claim 1, wherein the flash memory controller comprises:

a command register configured to store the received flash memory command;

a command decoder configured to decode the stored flash memory command, configured to transmit a read command for the micro-commands included in the instruction block corresponding to the decoded flash memory command to the memory controller, and configured to receive the micro-commands from the memory controller; and a command executor configured to execute the received micro-commands.

5. The flash memory command decoding system of claim 4, wherein the flash memory controller further includes a cache memory, and wherein the command decoder searches, in advance, the cache memory for the micro-commands included in the instruction block corresponding to the decoded flash memory command.

6. The flash memory command decoding system of claim 4, wherein the flash memory controller further includes an error correction unit configured to perform an error correction when the flash memory controller transmits or receives data.

7. The flash memory command decoding system of claim 3, wherein each of the micro-commands includes a first part representing a flash memory controller command for the flash memory controller and a second part representing additional information corresponding to the flash memory controller command.

8. The flash memory command decoding system of claim 7, wherein the first part is configured with four bits and the second part is configured with twelve bits.

9. A method of decoding a command, comprising:

receiving a command from a main processor;

sequentially fetching micro-commands included in an instruction block corresponding to the received command through a memory controller, the instruction block including the micro-commands for executing the received command; and executing the fetched micro-commands, wherein sequentially fetching the micro-commands comprises:

decoding the received command; and transmitting a read command for the micro-commands included in the instruction block corresponding to the decoded command to the memory controller.

10. A method of decoding a flash memory command, comprising:

receiving a flash memory command from a main processor;

sequentially fetching micro-commands included in an instruction block corresponding to the received flash memory command through a flash memory controller, the instruction block including the micro-commands for executing the received flash memory command; and executing the fetched micro-commands, wherein sequentially fetching the micro-commands comprises:

decoding the received flash memory command; and transmitting a read command for the micro-commands included in the instruction block corresponding to the decoded flash memory command to the memory controller.

11. The method of claim 10, further comprising performing an error correction operation when the flash memory controller transmits or receives data.

12. The method of claim 10, wherein sequentially fetching the micro-commands comprises searching, in advance, a cache memory for the micro-commands included in the instruction block corresponding to the decoded flash memory command.

* * * * *